United States Patent
Chesterfield et al.

[11] Patent Number: 5,868,518
[45] Date of Patent: *Feb. 9, 1999

[54] WEDGE AND SPOOL ASSEMBLY

[75] Inventors: David John Chesterfield, Belmont; Douglas Gordon Fisher, Cooks Hill, both of Australia

[73] Assignee: The ANI Corporation, Ltd., Australia

[*] Notice: This patent issued on a continued prosecution application filed under 37 CFR 1.53(d), and is subject to the twenty year patent term provisions of 35 U.S.C. 154(a)(2).

[21] Appl. No.: 617,468

[22] Filed: Mar. 15, 1996

[30] Foreign Application Priority Data

Mar. 15, 1995 [AU] Australia .................. PN-1745

[51] Int. Cl.⁶ .................................................. B25G 3/00
[52] U.S. Cl. .................. 403/379.4; 403/350; 403/374.3; 37/456
[58] Field of Search .................. 403/374, 378, 403/379, 318, 350; 37/453, 455, 456

[56] References Cited

U.S. PATENT DOCUMENTS

| | | |
|---|---|---|
| 943,775 | 12/1909 | Exton et al. . |
| 1,917,431 | 7/1933 | Clark . |
| 1,992,591 | 2/1935 | Whisler . |
| 3,455,040 | 7/1969 | Ratkowski . |
| 3,520,224 | 7/1970 | Hensley et al. ............ 403/379 X |
| 3,624,827 | 11/1971 | Liess ........................... 37/456 X |
| 3,664,044 | 5/1972 | Hahn . |
| 3,847,493 | 11/1974 | Peter et al. ................. 403/374 X |
| 4,136,469 | 1/1979 | Zepf . |
| 4,192,089 | 3/1980 | Schwappach ............... 403/379 X |
| 4,267,653 | 5/1981 | Hahn et al. . |
| 4,282,665 | 8/1981 | Fletcher et al. ............ 403/374 X |
| 4,357,765 | 11/1982 | Seykora . |
| 4,414,764 | 11/1983 | Johansson et al. . |
| 4,433,496 | 2/1984 | Jones et al. . |
| 4,460,289 | 7/1984 | Lundgren ................... 403/374 X |
| 4,782,607 | 11/1988 | Frisbee et al. . |
| 5,263,351 | 11/1993 | Berg, IIi ..................... 403/374 X |
| 5,293,908 | 3/1994 | Lefever et al. ............. 403/374 X |
| 5,350,183 | 9/1994 | Shealy ....................... 403/379 X |
| 5,452,529 | 9/1995 | Neuenfeldt et al. . |

FOREIGN PATENT DOCUMENTS

| | | |
|---|---|---|
| 68677/94 | 3/1995 | Australia . |
| 508595 | 11/1974 | U.S.S.R. ................. 403/379 |
| 95/01481 | 1/1995 | WIPO . |

Primary Examiner—Daniel P. Stodola
Assistant Examiner—Bruce A. Lev
Attorney, Agent, or Firm—Ratner & Prestia

[57] ABSTRACT

A wedging device locatable between two components and consisting of a plurality of parts connected together such that the device remains as a single cohesive assembly during all phases of operation. The wedging device comprises a spool having two inclined surfaces and a pair of wedges arranged such that each wedge is able to be moved up one of the inclined surfaces, respectively. The device also comprises a rotatable threaded member which extends through an aperture formed in the spool and is received by the wedges. Rotation of the threaded member when the device is located between the two components causes the wedges to move toward each other up the respective inclined surfaces of the spool and be pressed against one of the components to thereby force the spool against the other said component.

29 Claims, 4 Drawing Sheets

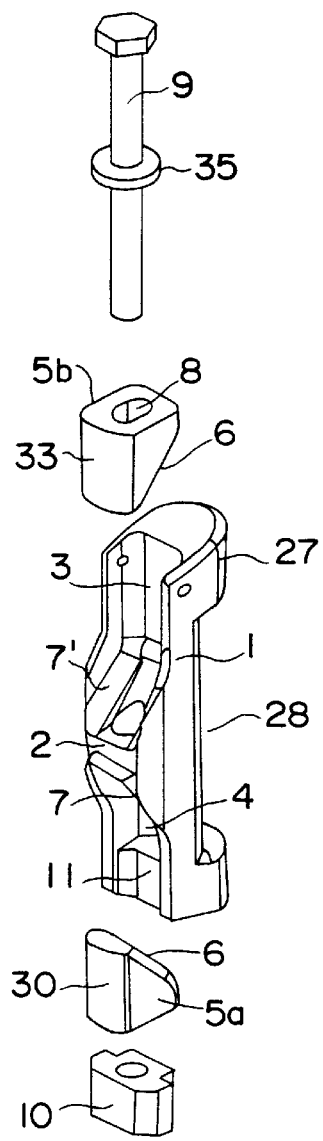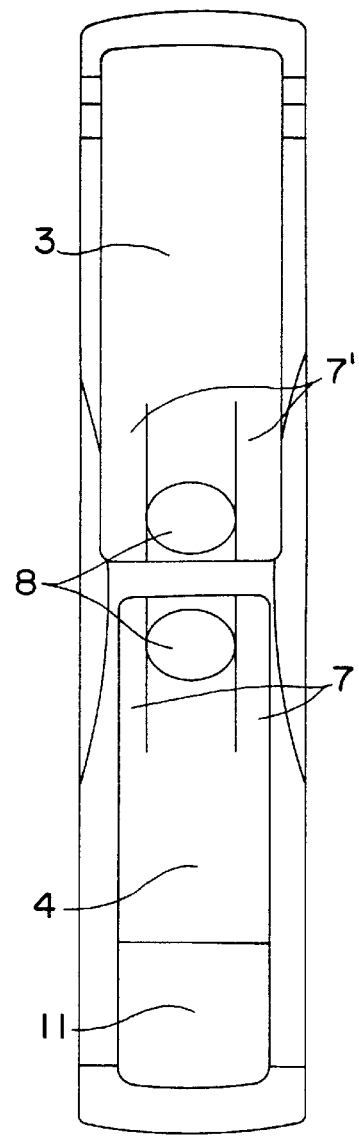
FIG. 1                    FIG. 2

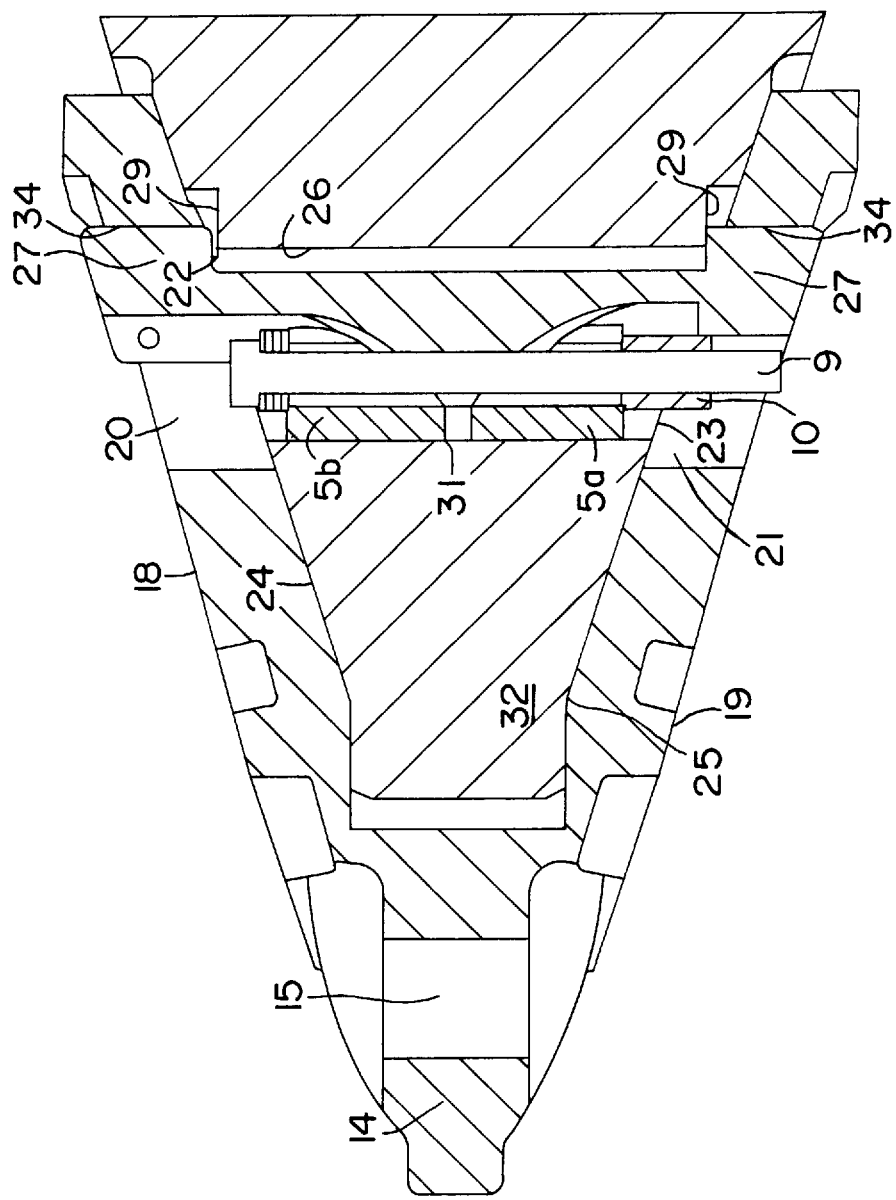

WEDGE AND SPOOL ASSEMBLY

FIELD OF THE INVENTION

The present invention relates to a wedging device for fixing an attachment to a support means. The wedging device may be used to connect an attachment to excavating equipment such as a dragline bucket, rope/hydraulic shovel or other excavating device. Accordingly, embodiments of the invention find application in the landscaping and mining fields.

BACKGROUND OF INVENTION

Devices for fixing attachments such as adaptors carrying sacrificial wear parts to dragline buckets are known in the prior art.

Generally, the adaptor is fitted onto a corresponding nose portion of the dragline bucket and a spool inserted into a passageway formed through the adaptor and the nose portion. In the past, a wedge was inserted into the passageway between the spool and a tip region of the nose portion and was then hammered into the passageway with a sledge hammer causing the spool to move rearwardly from the tip of the nose portion and press against the adaptor to thereby force the adaptor tightly onto the nose portion.

However, any misalignment in the openings through the adaptor and nose portion forming the passageway, due to wear or improper fitting of the adaptor, caused difficulty when inserting the wedge. Moreover, chips of metal could fly off the wedge or hammer as the wedge was being forced into the passageway posing a safety problem for persons in the immediate area. In addition, a sledge hammer needed to be available in order to insert the wedge, the use of which also posed a safety problem.

A wedging device comprising a wedge connected to a spool by means of a bolt is disclosed in U.S. Pat. No. 4,433,496. The wedge has an arcuate surface which bears against a correspondingly contoured arcuate surface on the spool. When the bolt is rotated the wedge is drawn up the arcuate surface of the spool so that a curved contact surface of the wedge is placed into abutment with the nose portion of the dragline bucket. However, the wedge exerts an offset force against the nose portion causing the adaptor to skew as it is drawn onto the nose portion when the bolt is rotated which presents difficulty to the workperson fixing the adaptor in position A wedging device consisting of two spools and a separate wedge assembly is disclosed in patent application WO 95/01481. The wedge assembly is comprised of two wedges and a bolt which extends through a passageway formed in one of the wedges and is threadably received in the other wedge. In use, the wedge assembly is positioned between the spools in the passageway formed through the adaptor and the nose portion of the dragline bucket, and the bolt rotated so that the spools are forced apart as the wedges are drawn toward each other causing one of the spools to be pressed against the nose portion and the other spool to be pressed against the adaptor. Accordingly, the movement of the wedges results in the adaptor being drawn onto, and fixed to, the nose portion.

However, the substantial forces which are exerted on the device during an excavating operation can cause a wedge to tilt and so bend the bolt in a region adjacent to the wedge. This may result in difficulty when loosening the bolt to remove the wedging device, and possibly seizure of the device in the dragline bucket. It may also lead to increased downtime of the dragline bucket while the wedging device is removed or at the least, the need for maintenance to the wedging device.

A further wedging device is disclosed in Australian patent application No. 68677/94. This device consists of a single spool and a separate wedge assembly comprising two wedges receiving a bolt. As with the device disclosed in WO 95/01481 the bolt extends through a passageway formed in one of the wedges and is threadably received in the other wedge. Accordingly, the arrangement suffers from the same drawback as the device disclosed in WO 95/01481 in that the bolt is prone to bending forces which may result in damage to the wedging device.

Due to the size of dragline buckets as well as the nature of the forces exerted on the buckets during use, the wedging devices are correspondingly large and typically weigh about 6 kg or more.

As the wedging devices disclosed in WO 95/01481 and AU 68677/94 are comprised of a number of separate unconnected parts, difficulties can arise when fixing the devices in position on a dragline bucket due to the need to align the separate parts with each other. The insertion of the wedging devices may also be hampered if there is misalignment of the adaptor and nose portion of the dragline bucket The weight of a wedging device of the type disclosed in WO 95/01481 and AU 68677/94 further compounds the difficulty in holding the separate parts of the wedging device together while being lowered into the passageway defined in the nose portion and adaptor. Furthermore, it is common for a workperson to be positioned so as to receive the wedging device from below the passageway as it is lowered into the adaptor and nose portion, and hold the device in position while another workperson tightens the bolt of the wedging device from above the passageway to thereby wedge the separate parts of the device together. The fact that the wedging device exists as separate parts poses safety risks not only to the workperson receiving the device as it is lowered into the passageway but also to the workperson holding the parts together while lowering the device.

SUMMARY OF THE INVENTION

It is an aim of the present invention to ameliorate at least one of the problems of the prior art.

In a first aspect of the present invention there is provided a wedging device locatable between two components and consisting of a plurality of parts connected together such that the device remains as a single cohesive assembly during all phases of operation, wherein the parts comprise:

a spool having two inclined surfaces;

a pair of wedges arranged such that the wedges are able to be moved up the inclined surfaces, one to each; and a rotatable threaded member extending through an aperture formed in the spool and being received by the wedges;

wherein rotation of the threaded member when the device is located between the two components causes the wedges to move toward each other up the respective said inclined surfaces of the spool and be pressed against one of the components to thereby force the spool against the other said component.

In order to cause the wedges to move up the inclined surfaces, the wedging device may be provided with a nut having a female thread engaged with a male thread formed on a shaft of the threaded member, wherein the nut is arranged to be able to exert a pressure on one of the wedges so that the nut and threaded member together force he wedges toward each other when the threaded member is rotated. Alternatively, the male thread of the threaded member may be engaged with a female thread provided on the one wedge itself.

So that the wedges may move up the inclined surfaces the aperture formed in the spool and/or apertures defined in the wedges which receive the threaded member can have a width which is substantially greater than that of the shaft of the threaded member.

The threaded member is formed such that the engagement of the threaded member with the nut or a female thread formed in one of the wedges holds the wedges on the threaded member. This, together with the reception of the threaded member in the aperture formed in the spool, maintains the wedging device in the form of a single cohesive assembly.

In a second aspect of the present invention there is provided a kit for a wedging device according to the first aspect of the invention, wherein the kit comprises the spool and the two wedges. The kit may also comprise the threaded member and the nut. The parts may be provided separately or be partly assembled together.

In a third aspect of the present invention there may be provided an assembly comprising the wedging device and the two components described above wherein the two components have openings which align to form a passageway and wherein the wedging device is arranged in the passageway such that the wedges are pressed against the one component and the spool is in contact with the other component.

The threaded member may be a bolt and preferably, the wedging device is provided with tensioning means for maintaining the wedges against the one component. Typically, the tensioning means will be a spring washer received on the bolt.

Embodiments of the present invention may be used, for example, in fixing an adaptor to a nose portion of a dragline bucket. It will be appreciated, however, that embodiments may be used for fixing components of other earth moving equipment together which are subject to substantial stresses during use.

The parts of the wedging device may be formed from a metal such as steel or any other high strength material. Moreover, embodiments of the invention may be manufactured by machining or conventional casting techniques.

It is an advantage that embodiments of the invention enable two components be fixed together with the use of a socket thereby minimising the risk of injury to the person installing the wedging device and other persons in the immediate surrounding area.

It is a further advantage that embodiments of the present invention can be provided as a single cohesive assembly enabling ease of installation of the wedging device in, and removal from, the two components.

It is yet another advantage that misalignment of the two components may be corrected by the wedges of the wedging device as the two components are being fixed together.

It is a still further advantage that an embodiment may be provided wherein the possibility of the threaded member bending as a result of forces exerted on the wedging device during use may be reduced.

The present invention will be further described hereinafter with reference to preferred, non-limiting embodiments of the present invention illustrated in the accompanying drawings.

BRIEF DESCRIPTION OF THE DRAWINGS

FIG. 1 is an exploded perspective view of a wedging device embodied by the present invention.

FIG. 2 is a top view of the spool of the wedging device of FIG. 1.

FIG. 5 is a cross-sectional side view of the adaptor and nose portion of FIG. 3 fixed together with the wedging device of FIG. 1.

DETAILED DESCRIPTION OF PREFERRED EMBODIMENTS OF THE INVENTION

Figure 3:
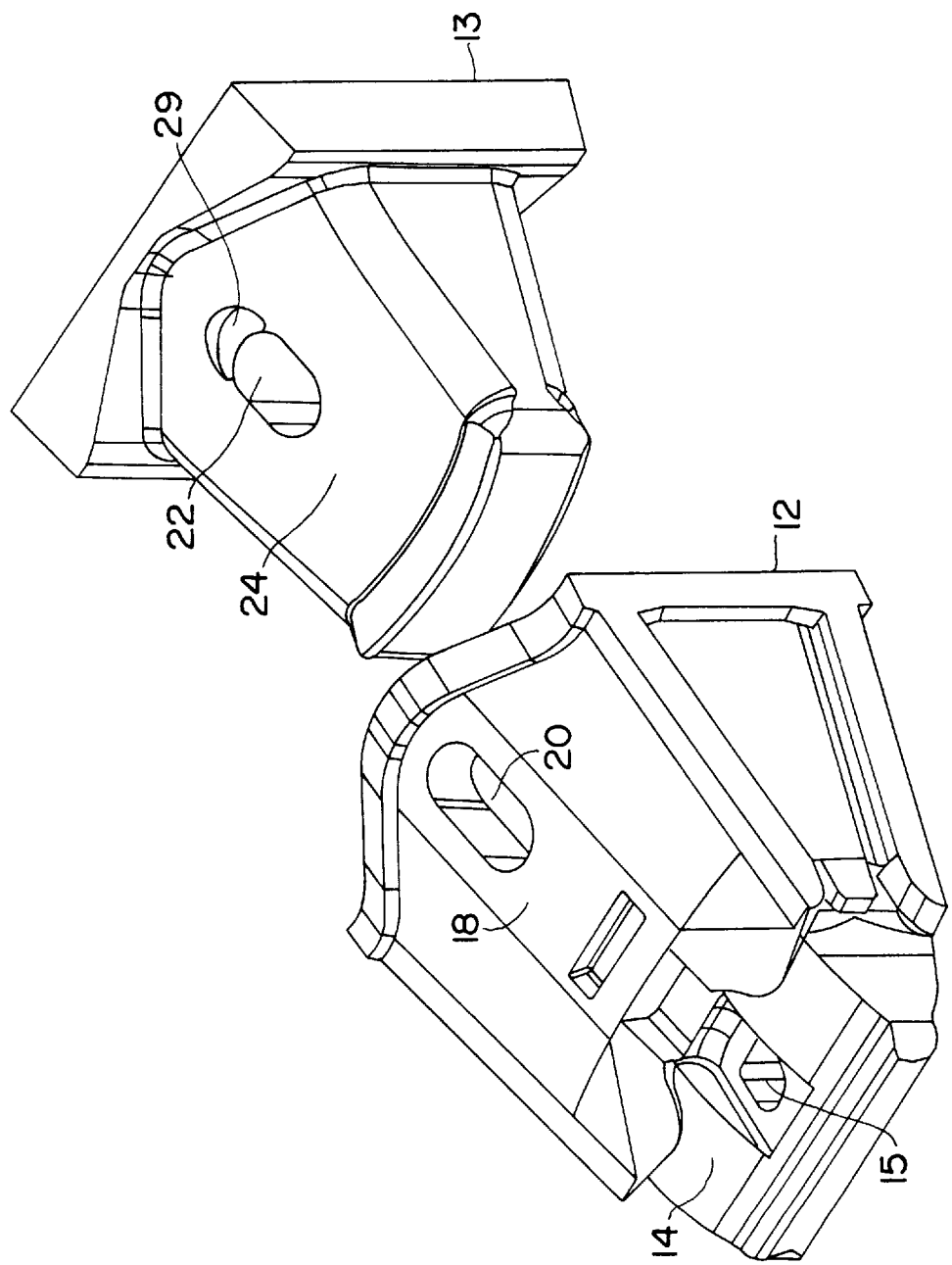
FIG. 3 is an exploded perspective view of an adaptor and a nose portion of a dragline bucket.

The wedging device illustrated in FIG. 1 is comprised of an elongate spool 1 having a ramp 2 which separates channels 3 and 4. Wedges 5a and 5b are slidably received in channels 4 and 3 respectively, and are provided with inclined surfaces 6 which are angled so as to correspond with the angle of inclined surfaces 7 and 7' of ramp 2.

Inclined surfaces 7 and 7' of ramp 2 are inclined at the same angle with respect to the longitudinal axis of spool 1. Generally, the surfaces will be inclined at an angle within the range of from about 20° to about 40°, and preferably about 28°.

Wedges 5a, 5b and ramp 2 have passageways 8 which receive bolt 9. When the wedging device is assembled, tile male thread of bolt 9 is engaged with a female thread formed in nut 10 which rests on step 11 defined in channel 4 of spool 1 and abuts rear end surface of wedge 5a. Nut 10 is shaped such that it is inhibited from rotating as bolt 9 is screwed into or out of nut 10.

However, in other embodiments, nut 10 may not be provided and the male thread of bolt 9 may be engaged with a female thread formed in wedge 5a itself.

A top view of spool 1 of the wedging device is shown in FIG. 2 As indicated in the figure, channel 3 and wedge 5b are wider than channel 4 and wedge 5a respectively, so as to allow positioning of a socket over the head of bolt 9.

The wedging device may be used to fix an adaptor to a nose portion of a dragline bucket. An adaptor 12 and nose portion 13 of a dragline bucket are illustrated in FIG. 3. Adaptor 12 has a tip region 14 formed to receive a sacrificial wear part (not shown). The sacrificial wear part is fitted on tip region 14 of adaptor 12 by a bolt which passes through aperture 15 while in use, adaptor 12 is fitted on nose portion 13.

Figure 4:
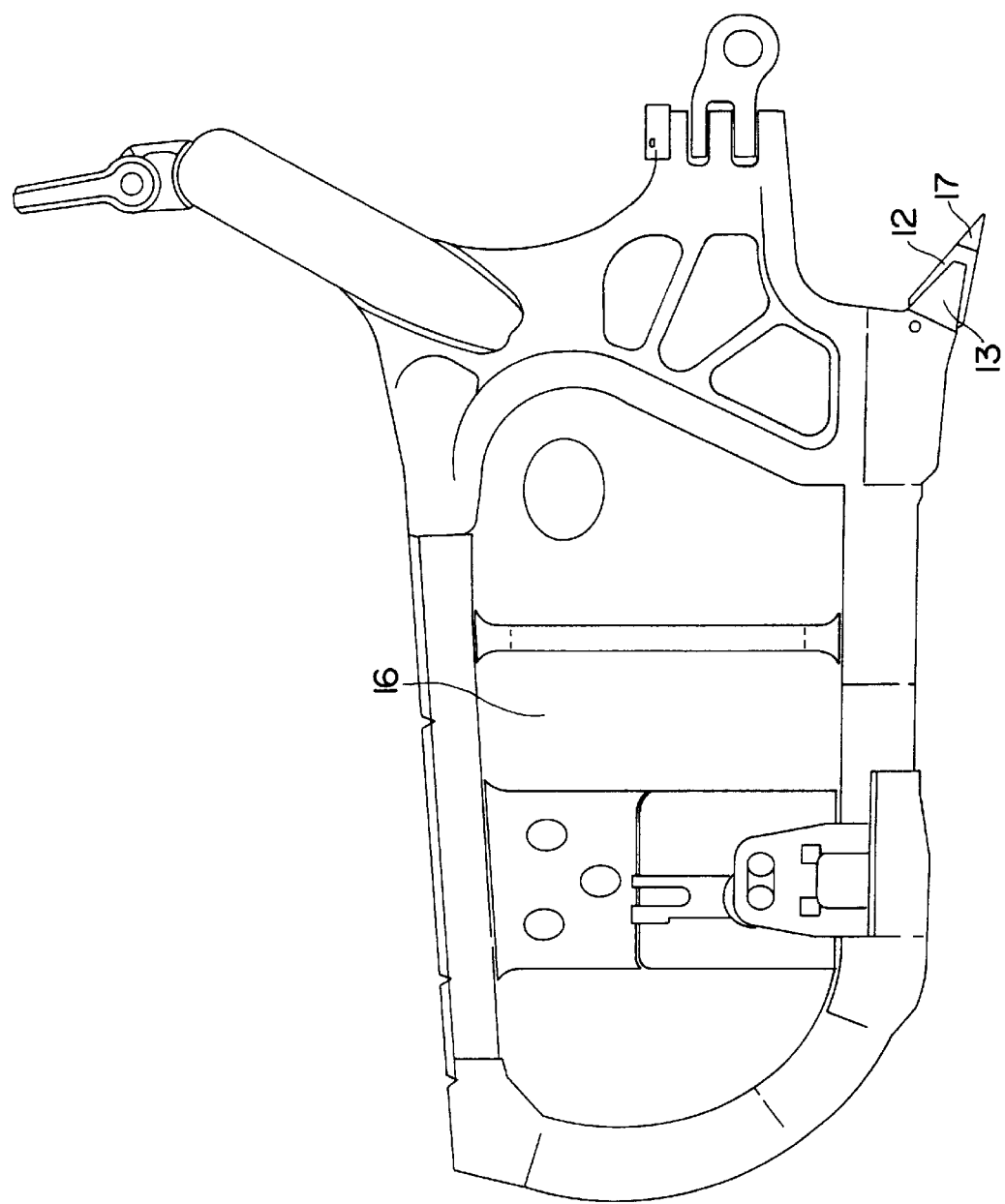
FIG. 4 is a side view of a dragline bucket.

A dragline bucket 16 is illustrated in FIG. 4. A plurality of adaptors 12 having sacrificial wear parts 17 are spaced apart along the front of the base of dragline bucket 16 so as to dig into ore, for example, when the dragline bucket 16 is dragged across an ore body as will be readily appreciated by the skilled addressee.

The operation of the wedging device will now be 30 described with reference to FIG. 5.

The upper and lower surfaces 18, 19 of adaptor 12 are provided with openings 20,21 which correspond with openings 22,23 formed in the upper and lower surfaces 24,25 of nose portion 13 to form a passageway 26 in which the wedging device is inserted. End portions 27 of spool 1 formed by recess 28 are received on ledges 29 of nose portion 13 which assists in positioning the wedging device in passageway 26 and holding it within the passageway.

In order to fix adaptor 12 to nose portion 13, bolt 9 is screwed into nut 10 which causes wedge 5a to slide along channel 4 towards ramp 2. When inclined surface 6 of wedge 5a contacts inclined surface 7 of ramp 2 the wedge is guided outwardly from channel 4 by the walls of channel 4 as it is drawn up inclined surface 7 to cause contact surface 30 of wedge 5a to contact reaction surface 31 of tip region 32 of nose portion 13.

Once wedge 5a wedges between the tip region 32 and inclined surface 7, wedge 5b is pushed along channel 3 by the head of bolt 9 as the bolt is screwed into nut 10 resulting in wedge 5b being forced outwardly from channel 3 as inclined surface 6 of the wedge is drawn up inclined surface 7' of ramp 2. Accordingly, contact surface 33 of wedge 5b is also moved into contact with the reaction surface 31 of nose portion 13 by rotation of the bolt.

Further rotation of bolt 9 forces end portions 27 of spool 1 against walls 34 of adaptor 12 forming openings 20 and 21 causing the adaptor to be drawn tightly onto nose portion 13 of dragline bucket 16 as wedges 5a and 5b are drawn closer toward each other.

Tensioning means 35 in the form of a spring washer inhibits bolt 9 from loosening and assists in maintaining wedges 5a and 5b in position and adaptor 12 securely fixed on nose portion 13.

Since the wedges press against opposite ends of reaction surface 31 skewing of adaptor 12 with respect to nose portion 13 is inhibited while the adaptor is being drawn into position on the nose portion. The wedges are shaped such that contact surfaces 30 and 33 are able to be placed into face to face contact with reaction surface 31 of tip region 32 as indicated in FIG. 5. While it is not necessary that the entire contact surface of each wedge is placed in abutment with reaction surface 31, the wedges will typically be shaped such that a significant part of each contact surface abuts reaction surface 31 in order to avoid localised crushing of the material from which tip region 32 is formed and to minimise friction which may otherwise be produced by substantially line contact between the wedges 5a, 5band reaction surface 31.

In order to allow the movement of wedges 5a and 5b up inclined surfaces 7 and 7' of ramp 2 the width of passageways 8 defined in wedges 5a and 5b are substantially greater than the width of the shaft of bolt 9 as again shown in FIG. 5.

The dimensioning of apertures 8 in this manner also allows for slight tilting of wedges 5a and 5b relative to the longitudinal axis of bolt 9 which may be caused by impact forces acting on the wedging device during use thereby reducing the possibility of bolt 9 bending In embodiments where nut 10 is not provided and bolt 9 is screwed directly into wedge 5a, the width of passageway 8 formed in spool 1 is dimensioned so that the width of the passageway is substantially greater than the width of the shaft of bolt 9 to enable movement of the wedges up inclined surfaces 7 and 7'. If desired, passageway 8 of wedge 5b may also have a substantially greater width than the shaft of the bolt.

Since bolt 9 is received in aperture 8 of spool 1, and wedges 5a and 5b are held on the shaft of bolt 9 by the head of the bolt and the engagement of the bolt with nut 10, the wedging device is maintained in the form of a single cohesive assembly while being inserted into, fixed in position within, and removed from passageway 26.

Moreover, any initial misalignment of adaptor 12 and nose portion 13 may be corrected by the movement of wedges 5a and 5b as bolt 9 is rotated While the wedging device illustrated in the accompanying drawings is designed so that wedges 5a and 5b press against reaction surface 31 of nose portion 13, and spool 1 of the wedging device presses against adaptor 12, embodiments may be provided wherein wedges 5a and 5b press against the adaptor while the spool presses against the nose portion.

Embodiments of the present invention may be provided as a single cohesive assembly or in kit form. A kit may, for example, comprise spool 1, and wedges 5a and 5b. If desired, one or more of bolt 9, nut 10 and spring washer 35 may be included in the kit. The parts may be provided separately or be partly assembled together.

Although the present invention has been described hereinbefore with reference to preferred embodiments, numerous variants and modifications are possible without departing the scope of the invention which is defined in the following claims.

We claim:

1. A wedging device adapted to secure together first and second interengaging components to prevent relative motion in a first direction, the components having respective walls defining:

(i) aperture means which cooperate with one another for accommodating the wedging device; and (ii) respective abutment surfaces extending substantially at right angles to the first direction for engaging in wedging engagement with the wedging device, the wedging device comprising parts which are interconnected to form a single cohesive assembly prior to, during and after installation with the two components, the parts of the wedging device including:

(a) a spool having an axis which in use is substantially at right angles to the first direction;

(b) an enclosed aperture through a central portion of the spool and extending substantially in the axial direction of the spool between first and second openings to the spool;

(c) the central portion having first and second ramps on the spool and providing respective inclined surfaces inclined to the axial direction and extending away from the axis in a direction generally away from the respective ends of the spool;

(d) a rotatable threaded member extending through the enclosed aperture and having means to retain the threaded member captive relative to the spool;

(e) first and second wedge elements mounted on the threaded member extending through first and second enclosed apertures respectively in said first and second wedge elements whereby the parts farm a single cohesive assembly, the wedge elements each having a ramp surface for engaging a corresponding one of said inclined surfaces and having an abutment surface extending substantially parallel to the axis to the spool for abutment with a corresponding abutment surface of the second component;

(f) spool abutment surfaces on the side of the spool opposite to the ramps for engaging the first component and extending substantially parallel to the spool axis, the spool abutment surfaces including abutment surface. portions extending towards the axial end portions of the spool relative to the central portion; and (g) the wedge elements being configured and positioned to contact the respective ramps and to move therealong upon rotation of the threaded member, rotation of the threaded member in a first rotational direction urging the wedge elements into wedging engagement between their respective inclined surfaces and the ramps and a surface of the second component, and by reaction urging the spool abutment surfaces against the first component and rotation of the threaded member in a second rotational direction opposite to the first rotational direction permitting relief of the wedge elements from wedging engagement between their respective inclined surfaces and the ramps and a surface of the second component.

2. A wedging device according to claim 1, wherein the threaded member has a male threaded portion which is engaged with a female threaded portion of a nut and wherein the nut is able to exert a pressure on one of the wedge elements, and is movable with the one said wedge element axially relative to the spool when the threaded member is rotated.

3. A wedging device according to claim 2 and further comprising means to inhibit rotation of the nut during rotation of the threaded member.

4. A wedging device according to claim 2, wherein each said wedge element has an enclosed aperture which receives the threaded member and has a width which is substantially greater than that of the threaded member.

5. A wedging device according to claim 2, wherein the enclosed aperture defined in the spool has a width which is substantially greater than that of the threaded member.

6. A wedging device according to claim 2, wherein the wedge elements are held on the threaded member, and wherein the holding of the wedge elements on the threaded member, together with the reception of the threaded member in the enclosed aperture formed in the spool, maintains the wedging device in the form of said single cohesive assembly.

7. A wedging device according to claim 1, wherein the threaded member has a male thread which is engaged with a female threaded portion defined on one of the wedge elements and wherein the engagement of the threads causes the wedge elements to be drawn up the respective said inclined surfaces of the spool when the threaded member is rotated.

8. A wedging device according to claim 7, wherein: (a) the other said wedge element has an enclose aperture which receives the threaded member and has a width which is substantially greater than that of the threaded member, and (b) the enclosed aperture extending through the spool has a width which is substantially greater than that of the threaded member.

9. A wedging device according to claim 7, wherein the enclosed aperture defined in the spool has a width which is substantially greater than that of the threaded member.

10. A wedging device according to claim 7, wherein the wedge elements are held on the threaded member, and wherein the holding of the wedge elements on the threaded member, together with the reception of the threaded member in the enclosed aperture formed in the spool, maintains the wedging device in the form of said single cohesive assembly.

11. A wedging device according to claim 1, wherein the spool has means for guiding the wedge elements along the ramps when the threaded member is rotated.

12. A wedging device according to claim 11, wherein the guiding means comprises a plurality of channels formed in the spool and each said wedge element is received in a respective said channel, and wherein the wedge elements are guided along the spool by walls of the channels when the threaded member is rotated.

13. A wedging device according to claim 1, wherein each of the wedge elements is shaped so as to be able to be moved into face to face contact with the first component when the threaded member is rotated.

14. A wedging device according to claim 1, wherein each of the wedge elements is shaped so as to be able to be moved into face to face contact with the respective one of said inclined surfaces of the ramps.

15. A wedging device according to claim 1, wherein the inclined surfaces are substantially planar and inclined at substantially the same angle with respect the axis of the spool and towards one another in the first direction and wherein the angle to the spool axis is in the range of from 20° to 40°.

16. A wedging device according to claim 1, further comprising tensioning means for maintaining tension on the threaded member when the wedges are pressed against the second component.

17. A wedging device according to claim 16, wherein the tensioning means is a spring washer received on the threaded member.

18. A wedging device according to claim 1, wherein the first component is adapted to receive a sacrificial wear part and the second component is a nose portion of a dragline bucket.

19. A wedging device according to claim 1 and wherein a recess is defined in the spool between the spool abutment surfaces, shoulders being defined at the junction of ends of the recess and the respective abutment surfaces whereby a corresponding projecting portion of the first component is received in the recess, the first component having surfaces extending substantially at right angles to the axis of the spool over which said shoulders fit.

20. A wedging device according to claim 1 and wherein the threaded member has a head to receive torque for rotating the threaded member and the spool has a recess accommodating the head of the threaded member at a location remote from the axial end of the spool whereby the end of the threaded member is protected.

21. An excavating implement having:
  (a) a main body,
  (b) a replaceable excavating tool portion having a tool tip and a support portion,
  (c) a mounting portion on the main body for mounting the tool portion through its support portion,
  (d) the support portion and mounting portion having respective interengagement portions with one locating within the other upon interengagement by relative motion along a first direction,
  (e) the interengagement portions having respective walls defining co-operating apertures extending transverse to the first direction,
  (f) fixing means extending into the respective apertures to fix removably the tool portion on the mounting portion, and
  (g) the fixing means comprising an assembly the parts of which are interconnected before, during and after installation, the parts comprising:
    is (i) a spool having on one side thereof first and second inclined ramp surfaces, which are inclined to the transverse direction in which said apertures extend, with first and second openings respectively between which an enclosed aperture extends, and on the opposite side thereof a wall defining an abutment for engagement with one of said respective walls,
    (ii) first and second wedges having respective engagement surfaces for sliding over the respective ramp surfaces, and respective abutment surfaces for abutting the other of the respective walls of the interengagement portions, (iii) a rotatable threaded member extending through the enclosed aperture in the spool and being interengaged with the wedges, rotation of the threaded member in a fist direction displacing the wedges up the inclined ramp surfaces towards one another and to press against the other of said respective walls, the abutment on the spool being thereby pressed towards and against said one of said respective walls to establish frictional engagement to fix the tool portion on the mounting portion, rotation of the threaded member in a direction opposite to the first direction loosening the fixing means whereby it may be removed and the tool portion removed from the mounting portion.

22. An excavating implement according to claim 21 and wherein the inclined ramp surfaces on the spool are in a central region thereof and the wall on the opposite side of the spool defining the abutment comprises two spaced abutment surfaces each extending substantially parallel to the axis of the spool and displaced toward axial end portions of the spool relative to the central portion.

23. An excavating implement according to claim 21 and wherein the support portion has a tapered cavity into which fits a nose portion of the mounting portion, the fixing means is substantially enshrouded by the support portion, the first and second wedges abut a wall surface of the nose portion extending substantially parallel to the axis of the spool in a central region of the spool and wherein the rotatable threaded member has a head for receiving applied torque which is disposed adjacent one of the wedges and below the surface of the support portion.

24. An excavating implement according to claim 21 and wherein the threaded member is a bolt, each of the first and second wedges has an enclosed bore therethrough accommodating the bolt and each said bore being enlarged relative to the diameter of the bolt in a direction away from the axis of the spool towards the engagement surfaces of the wedges, and the fixing means further comprising a nut threadably engaged on the free end portion of the bolt to maintain the fixing means as a single cohesive assembly.

25. A wedge unit comprising:
a spool having:
  (a) first and second ramps on a first external surface of said spool, each of said ramps extending inward of said spool from a center point on said spool toward the ends of said spool,
  (b) an enclosed passageway extending axially through said spool with a first opening in said first ramp and a second opening in said second ramp, and
  (c) a bearing surface on a second external surface of said spool diametrically opposed to said first external surface of said spool;
first and second wedge members each having:
  (a) an inclined surface bearing against one of said ramps of said spool,
  (b) a bearing surface diametrically opposed to said bearing surface of said spool, and
  (c) an enclosed passageway extending axially of said wedge member; and
a tightening unit extending through said enclosed passageways in said first and said second wedge members and said enclosed passageway in said spool and bearing against said first and said second wedge members to draw said first and second wedge members toward each other and move said first and said second wedge members radially outward in a first direction and said spool radially outward in a second direction opposite to said first direction of radial movement of said first and said second wedge members.

26. A joint comprising:
first workpiece having a first through hole;
a second workpiece having a second through hole aligned with said first through hole in said first workpiece;
a spool extending through said through holes in said fist and said second workpieces and having:
  (a) first and second ramps on a first external surface of said spool, each of said ramps extending inward of said spool from a center point on said spool toward the ends of said spool,
  (b) an enclosed passageway extending axially through said spool with a first opening in said first ramp and a second opening in said second ramp, and
  (c) a bearing surface on a second external surface of said spool diametrically opposed to said first external surface of said spool;
first and second wedge members each having:
  (a) an inclined surface bearing against one of said ramps of said spool,
  (b) a bearing surface diametrically opposed to said bearing surface of said spool, and
  (c) an enclosed passageway extending axially of said wedge member; and
a tightening unit extending through said enclosed passageways in said first and said second wedge members and said enclosed passageway in said spool drawing said first and said second wedge members toward each other to:
  (a) move said first and said second wedge members radially outward and urge said bearing surfaces of said wedge members against said through hole in said first workpiece, and
  (b) move said spool radially outward and urge said bearing surface of said spool against said through hole in said second workpiece.

27. An excavating apparatus comprising a body portion and a replaceable tool element, the body portion having a first component of the apparatus acting as a mounting portion and the tool element being fixed to a second component of the apparatus and functioning as a device to be mounted on the first component, the second component having a cavity extending in a first direction and adapted to receive as a taper fit a portion of the first component, the first and second interengaging components being secured together by a wedging device to prevent relative motion in the first direction, the components having respective walls defining:
  (i) aperture means which cooperate with one another for accommodating the wedging device; and
  (ii) respective abutment surfaces extending substantially at right angles to the first direction for engaging in wedging engagement with the wedging device, the device comprising parts which are interconnected to form a single cohesive assembly prior to, during and after installation with the two components, the parts including:
    (a) a spool having an axis which in use is substantially at right angles to the first direction;
    (b) an enclosed aperture through a central portion of the spool and extending substantially in the axial direction of the spool;
    (c) the central portion having first and second ramps on the spool with first and second opening respectively between which said enclosed aperture extends and providing respetive inclined surfaces inclined to the axial direction and extending away from the axis in a direction generally away from the adjacent end of the spool;

(d) a rotatable threaded member extending through the enclosed aperture and having means to retain the threaded member captive relative to the spool;

(e) first and second wedge elements captive on the threaded member extending through first and second enclosed apertures respectively in said first and second wedge elements whereby the parts form a single cohesive assembly, the wedge elements each having a ramp surface for engaging a corresponding one of said inclined surfaces and having an abutment surface extending substantially parallel to the axis of the spool for abutment with a corresponding abutment surface of the second component;

(f) spool abutment surfaces on the side of the spool opposite to the ramps for engaging the first component and extending substantially parallel to the spool axis, the spool abutment surfaces including abutment surface portions extending towards the axial end portions of the spool relative to the central portion;

(g) the wedge elements being configured and positioned to contact the first and second ramps and to move therealong upon rotation of the threaded member, rotation of the threaded member in the wedging direction urging the wedge elements into wedging engagement between their respective inclined surfaces of the ramps and a surface of the second component, and by reaction urging the spool abutment surfaces against the first component.

28. A wedge unit comprising:

a spool having:
  (a) first and second ramps on a first external surface of said spool and extending inward of said spool toward the ends of said spool,
  (b) an enclosed passageway extending axially through said spool with a first opening in said first ramp and a second opening in said second ramp, and
  (c) a bearing surface on a second external surface of said spool opposed to said first external surface of said spool;

first and second wedge members each having:
  (a) an inclined surface bearing against one of said ramps of said spool,
  (b) a bearing surface opposed to said bearing surface of said spool, and
  (c) an enclosed passageway extending axially of said wedge member; and a tightening unit extending through said enclosed passageways in said first and said second wedge members and said enclosed passageway in said spool and bearing against said first and said second wedge members to draw said first and second wedge members toward each other and move said first and said second wedge members outward in a first direction and said spool outward in a second direction opposite to said first direction of movement of said first and said second wedge members.

29. A joint comprising:

a first workpiece having a first through hole;

a second workpiece having a second through hole aligned with said first through hole in said fist workpiece;

a spool extending through said through holes in said first and said second workpieces and having:
  (a) first and second ramps on a first external surface of said spool and extending inward of said spool toward the ends of said spool,
  (b) an enclosed passageway extending axially through said spool with a first opening in said first ramp and a second opening in said second ramp, and
  (c) a bearing surface on a second external surface of said spool opposed to said first external surface of said spool;

first and second wedge members each having:
  (a) an inclined surface be g against one of said ramps of said spool,
  (b) a bearing surface opposed to said bearing surface of said spool, and
  (c) an enclosed passageway extending axially of said wedge member; and a tightening unit extending through said enclosed passageways in said first and said second wedge members and said enclosed passageway in said spool drawing said fat and said second wedge members toward each other to:
  (a) move said first and said second wedge members outward and urge said bearing surfaces of said wedge members against said through hole in said first workpiece, and
  (b) move said spool outward and urge said bearing surface of said spool against said through hole in said second workpiece.

* * * * *

UNITED STATES PATENT AND TRADEMARK OFFICE
CERTIFICATE OF CORRECTION

PATENT NO. : 5,868,518
DATED : February 9, 1999
INVENTOR(S) : Chesterfiled, et. al.

It is certified that error appears in the above-identified patent and that said Letters Patent is hereby corrected as shown below:

Title page, item [57], Abstract, line 1, after "device" insert --is disclosed that is --.

In claim 1, column 6, line 47, "farm" should read -- form --.

In claim 21, column 8, line 58, delete "is".

In claim 21, column 9, line 6, "fist" should read -- first --.

In claim 26, column 10, line 9, "fist" should read -- first --.

In claim 29, column 12, line 30, "be g" should read -- bearing --.

In claim 29, column 12, line 39, "fat" should read -- first --.

Signed and Sealed this

Twenty-first Day of September, 1999

Attest:

Q. TODD DICKINSON

*Attesting Officer*    *Acting Commissioner of Patents and Trademarks*